United States Patent [19]

Hodge

[11] Patent Number: 4,691,956
[45] Date of Patent: Sep. 8, 1987

[54] COUNTERBALANCED TAILGATE FOR DUMP BOXES

[75] Inventor: Harold F. Hodge, Santa Clara, Calif.

[73] Assignee: Cook's Truck Body Mfg., Inc., Santa Clara, Calif.

[21] Appl. No.: 753,641

[22] Filed: Aug. 12, 1985

[51] Int. Cl.⁴ ............................................. B62D 25/00
[52] U.S. Cl. ...................................... 296/51; 296/56; 296/57 A
[58] Field of Search .............. 296/50, 51, 57 R, 57 A, 296/56; 298/23 A; 49/386

[56] References Cited

U.S. PATENT DOCUMENTS

| | | | |
|---|---|---|---|
| 2,260,504 | 10/1941 | Barrett | 296/51 |
| 2,821,431 | 1/1958 | Crompton | 296/57 R |
| 3,027,188 | 3/1962 | Eichstadt | 296/51 |

Primary Examiner—Robert B. Reeves
Assistant Examiner—Carol L. Olson
Attorney, Agent, or Firm—Claude A. S. Hamrick

[57] ABSTRACT

An improved counterbalanced tailgate for dump boxes including a continuous pivot shaft which extends across the entire width of the gate bottom and is rotatably contained within the gate and extends through the sides thereof. One or more heavy duty helical springs are coaxially mounted about the shaft with one end of each spring being attached to the shaft, and the other either affixed to or bearing against a portion of the tailgate so that the springs resiliently resist rotation of the shaft about its longitudinal axis. A bayonette type latching arm is rigidly attached to each protruding shaft end, and an opening is provided in the lower side wall of the dump body on each side to receive the latching arms. Appropriate pawl mechanisms are disposed either within the walls of the dump body, or therebeneath for engaging the latching arms such that when the arms are in a locked position, outer ends of the shaft will engage, and the gate will be supported by, a socket forming striker bracket as the gate is pivoted downwardly against the resilient bias of the counterbalancing springs.

7 Claims, 4 Drawing Figures

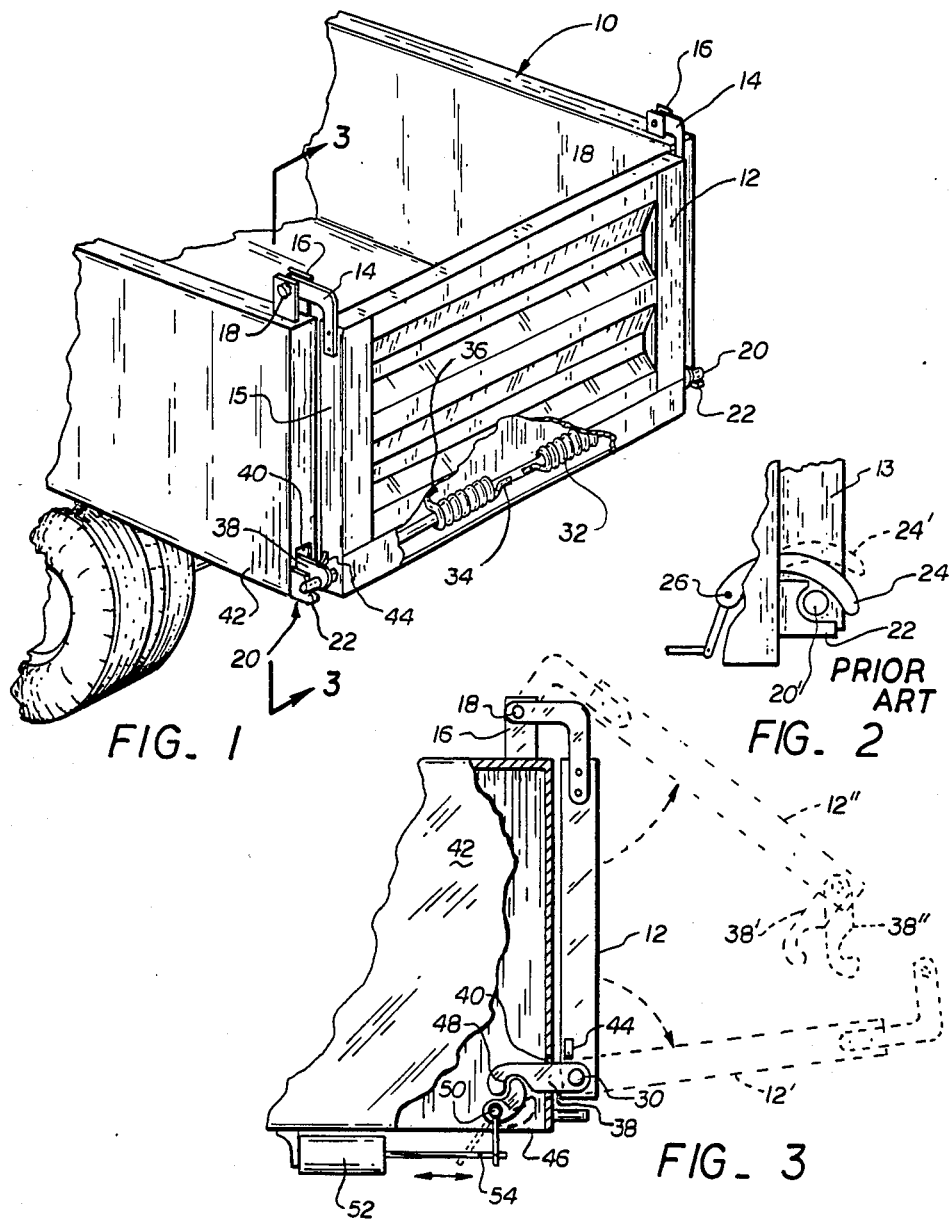

COUNTERBALANCED TAILGATE FOR DUMP BOXES

BACKGROUND OF THE INVENTION

1. Field of the Invention

The present invention relates generally to tail gate devices of the type used in heavy hauling applications and more particularly to an improved counterbalanced dump gate construction.

2. Description of the Prior Art

Dump bodies have long been provided with pivotable tail gate constructions to facilitate removal of carried materials by merely raising the front end of the body and allowing the carried material to slide from the rear past a tail gate which is either pivoted at the top and latched at the bottom, or pivoted at the bottom and latched at the top, or both. An early version of the latter is disclosed in the U.S. Pat. No. 1,371,036 to D. E. Le Force.

Very early on, it was recognized that when the gate was opened by pivoting it about its bottom edge, the very large and heavy gate was apt to fall rapidly with the likelihood of injuring workers or striking an object and causing damage to either the gate or the object struck or both. In order to avoid this problem, spring loading mechanisms such as that disclosed in the U.S. Pat. No. 514,076 to C. Hotz, were provided to counterbalance the weight of the gate. The problem with such constructions however, was that if such means were utilized, it was difficult and perhaps even impractical to allow the gate to be alternatively pivoted from the top because to do so meant dismantling of the counterbalancing apparatus.

Subsequently, a counterbalancing structure was disclosed in U.S. Pat. No. 2,260,504 to E. R. Barrett which included a latching structure at the bottom of the gate that allowed the gate to be pivoted from the top, and included a spring loaded counterbalancing mechanism mounted in the side walls of the truck body with means for engaging the lower pivot pins of the gate in such a manner that when the gate was pivoted at its bottom, the counterbalancing forces were applied to the lower portion of the gate allowing it to be safely rotated about its pivot pins into its open position. The problem with such structure however, was that it provided a rather complicated mechanism for engaging the lower pivot pins of the gate and required modification of the dump body to accommodate the counterbalancing spring mechanism. Furthermore, since the bottom latching mechanism was actuated from the front of the truck, it was not unusual that a worker closing or cleaning debris from the gate had his fingers impaired in the process.

SUMMARY OF THE PRESENT INVENTION

It is therefore an object of the present invention to provide a simple counterbalancing structure which can be incorporated into a new tailgate or retrofitted to an existing tailgate and one which requires minimal modification of any part of the dump body.

Another object of the present invention is to provide a novel dump gate construction in which a counterbalancing force applying member is contained within the lower portion of the gate.

Briefly, the present invention includes the provision of a continuous pivot shaft which extends across the entire width of the gate bottom and is rotatably contained within the gate and extends through the sides thereof. One or more heavy duty helical springs are coaxially mounted about the shaft with one end of each spring being attached to the shaft and the other either affixed to or bearing against a portion of the tail gate so that the springs resiliently resist rotation of the shaft about its longitudinal axis. A bayonette type latching arm is rigidly attached to each protruding shaft end and an opening is provided in the lower side wall of the dump body on each side to receive the latch arms. Appropriate latching mechanisms are disposed either within the walls of the dump body or therebeneath for latchingly engaging the arms such that when in the locked position the gate will be supported by a striker bracket as it is pivoted downardly against the resilient bias of the counterbalancing springs.

An important advantage of the present invention is that it requires only minor modification of either the dump body or the body carried latching mechanism.

Another advantage of the present invention is that the counterbalancing spring mechanism is entirely enclosed within the gate device.

Still another advantage of the present invention is that because the latching operation occurs internally of the outerwalls of the truck body, the likelihood of injury to workers is substantially reduced.

IN THE DRAWING

FIG. 1 is a partially broken perspective view illustrating the principal counterbalancing components of an improved tail gate mechanism in accordance with the present invention;

FIG. 2 is a diagram illustrating a prior art latching mechanism;

FIG. 3 is a broken partial side view looking in the direction of the line 3—3 of FIG. 1 and illustrating operation of the present invention;

DETAILED DESCRIPTION OF THE PREFERRED EMBODIMENT

Figure 4:
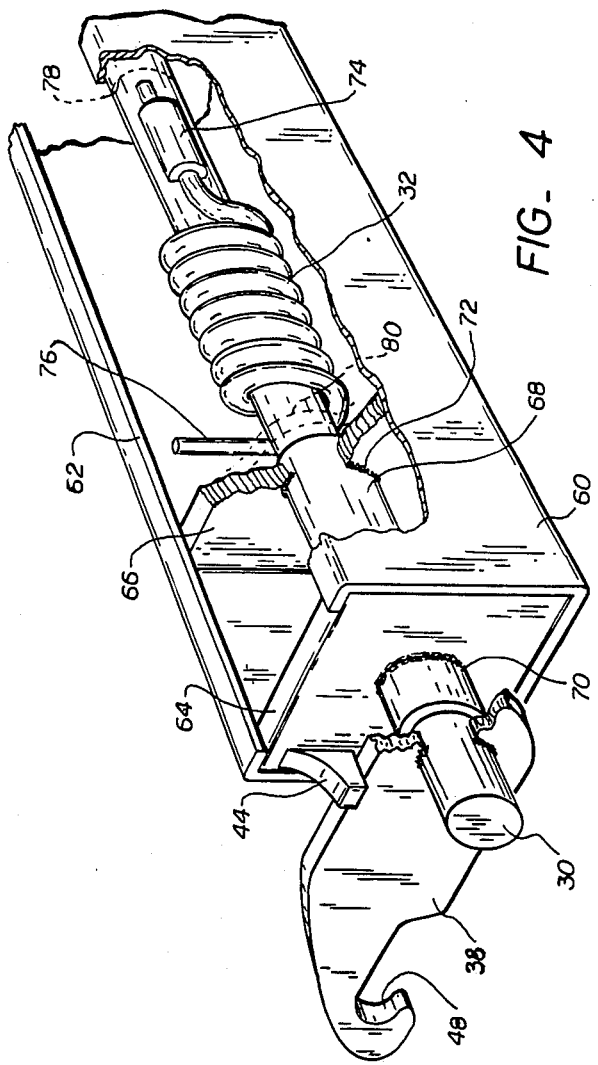
FIG. 4 is an enlarged perspective view showing a preferred manner of implementing the present invention.

Referring now to FIG. 1 of the drawing, a typical dump body is shown at 10 having a tail gate 12 affixed to the rear opening thereof. With the exception of the counterbalancing mechanisms to be described below, the gate 12 is of a standard configuration and is pivotably connected at its top by means of standard L-shaped arms 14 which are rigidly secured to the top portions of the end-walls 15 of gate 12 and are pivotably secured to upstanding brackets 16 by means of suitble removable pins 18.

As in prior art gate apparatus, pivot members 20 extend from the lower extremities of the end-walls 15 and matingly engage sockets formed in support and pivot brackets 22. However, in accordance with the present invention, the pivot members 20 are formed by a rotatable shaft 30 and are not latched into position in the same manner as previously accomplished. In the prior art arrangement of FIG. 2, pivot socket forming brackets 22 extend from each side of the truck body immediately beneath the locations of pivotable latch fingers 24 which, when actuated by a suitable mechanism (not shown), are caused to pivot about a shaft 26 and lockingly engage members 20 and secure them against the brackets 22 so that the gate 13 may be rotated downwardly. In order to allow the gate 13 to be opened at the bottom and pivot about the upper pins 18, latch arms 24 are raised into the upper position shown by the dashed lines 24', freeing the pivot members 20 and allowing the gate to swing outwardly out of engagement with bracket 22. Note that, in the illustrated prior art configuration, the pivot members 20' are free to rotate against the supporting brackets 22 and are typically short studs welded to the end-walls of the gate.

Returning again to FIG. 1, it will be noted that in accordance with the illustrated embodiment of the invention, instead of using the prior art fixed pivot member configuration previously described, a shaft 30 is provided which extends all the way through the lower portion of gate 12 and is adapted to be rotatably carried thereby. Internally, a pair of heavy duty helical springs 32 are coaxially carried by shaft 30 and have one end of each spring welded or otherwise secured to shaft 30 at 34 with the other end being either secured to or adapted to engage an interior wall of gate 12 as illustrated at 36. Attached to each end of shaft 30 is a latch arm 38 which is rigidly affixed to the shaft and adapted to extend at right angles to the plane of the gate so as to project into openings 40 provided in each side wall 42 of body 10. Stops 44 affixed to each end of gate 12 engage the top edge of the arms 38 to prevent their rotation in the clockwise direction (as depicted) under the biasing influence of springs 32.

Turning now to FIG. 3, generalized details of the arms 38 and their association with a suitable latching means 46 is illustrated. As depicted, a notch 48 is provided at the lower edge of each arm 38 so that after entry into the opening 40 it can be lockingly engaged by a latching pawl 46 which is rotated about a pivot shaft 50 by means of a standard actuating mechanism 52 and appropriate linkage 54. When arm 38 is engaged by pawl 46, the latched end will be firmly secured so as to hold shaft 20 in supporting engagement with brackets 22, thereby supporting gate 12. In the event that the pins 18 are removed from brackets 16, gate 12 can be rotated downwardly as illustrated by the dashed lines 12' in FIG. 3.

Note however, that as gate 12 is rotated, shaft 30 will be constrained from rotation because of its attachment to arm 38, and as a consequence, the relative motion between shaft and gate is resisted by springs 32 and the desired counterbalancing action is obtained. It will be appreciated that by appropriately selecting the characteristics of springs 32, gate 12 can be allowed to rotate all the way down into its vertical position or stop at some intermediate point. If it is desired that it stop at a point parallel to the dump body floor, a suitable chain or other restraining mechanism would normally be utilized.

If on the other hand, one wishes to unlatch the bottom of the gate and allow it to swing outwardly about the pivot pins 18, as would normally be the case where the front end of the body is raised to allow material contained therein to slide out of rear, actuator 52 would be energized to retract the pawls 46 from their engagement with arms 38. In such case, the gate bottom will be free to swing outwardly, as illustrated by the dashed lines 12".

As mentioned earlier, the arm 38 is held in a position normal to the plane of gate 12 by means of stops 44. However, in the event that either arm is engaged by dumped materials such as rocks or boulders carried as load, or in the event that the gate should strike an object on the ground as the truck is moved forward during the dumping operation, it will be appreciated that the arms 38 will be free to rotate downwardly (counter clockwise) against the influence of springs 32 as illustrated by the dashed lines 38' and 38".

Turning now to FIG. 4, details of the construction of one embodiment of the present invention is shown. In this form the counterbalancing and latching mechanism may be preconstructed and then attached to the bottom of a standard or perhaps slightly modified gate structure. As illustrated, the preconstructed unit consists of a channel like member 60 which is open at the top as indicated at 62 and of a length equal to that of the gate. Welded to each end of channel 60 are a pair of end plates 64 and 66, each of which have central openings provided therein for receiving a tubular sleeve 68 which is welded to each plate, as indicated at 70 and 72, during construction of the device, the bar forming shaft 30 is then inserted through the tubular sleeves 68 and coils 32 and properly positioned. One end of each coil 32 is then affixed to shaft 30 by means of welding, clamping or other suitable means, as illustrated at 74, with the other end being affixed to or simply left free to engage a side wall of member 60, as illustrated at 76. Completion of construction is then accomplished by welding the arms 38 to each end of shaft 30. It will be appreciated that once the arms 38 are secured to each end of shaft 30 the shaft can no longer move in the axial direction. Thereafter, the illustrated subassembly is merely welded to the bottom of the remaining gate assembly.

Although the present invention has been disclosed herein as including a single shaft extending through the length of the gate, it will be appreciated that a pair of short shafts of length indicated by dashed line 78 could likewise be utilized on each side of the gate, in which case a large washer or other suitable collar forming means would be attached to shaft 30, as illustrated by the dashed lines 80, to prevent axial movement of the shafts.

Whereas the present invention has been disclosed herein in terms of certain preferred embodiments, it is anticipated that after having read the above disclosure, certain alterations and modifications thereof will no doubt become apparent to those skilled in the art. It is therefore intended that the appended claims be interpreted as covering all such alterations and modifications as fall within the the true spirit and scope of the invention.

What is claimed is:

1. In a tail gate assembly for closing the rear end of a dump box including a generally rectangular gate means, upper attachment means for releasably and pivotally attaching the top of the gate to each side wall of the dump box, and lower attachment means for releasably and pivotally attaching the bottom of the gate to each said side wall, an improved lower attachment means comprising:

selectively actuatable pawl means disposed generally interiorally of the rearmost and lowermost extremities of each said side wall, each said side wall having a rearwardly facing opening provided therein proximate said pawl means, and support and pivot bracket means extending rearwardly from the lower most extremity of each said side wall with shaft receiving socket means formed therein;

shaft means having end portions extending through the lower extremity of each side of said gate and along a longitudinal axis lying parallel to a plane including a face of said gate, said shaft means being rotatable about said longitudinal axis and carried by said gate;

resilient means disposed within said gate and coupled between said shaft means and said gate and operative to apply a torsional counterbalancing force between said shaft means and said gate; and elongated latch arm means rigidly affixed to said end portions of said shaft means and extending forwardly and generally normal to said plane, said arm means being positioned on said shaft means so as to extend through said openings when the outermost extremities of said end portions of said shaft means are engaged with said socket means, said arm means having notches formed therein and disposed proximate the foremost portions thereof for facilitating locking engagement with said pawl means, whereby when said upper attachment means is detached and said pawl means and arm means are engaged, the top of said gate may be rotated downwardly about said shaft means with said resilient means providing said torsional counterbalancing force thereto, and when said upper attachment means is attached and said pawl means is disengaged from said arm means, the bottom of said gate may be rotated upwardly, pivoting about said upper attachment means and withdrawing said arm means from said openings.

2. In a tailgate assembly as recited in claim 1, wherein said shaft means is a single continuous bar extending through the entire length of said gate.

3. In a tail gate assembly as recited in claim 2, wherein said resilient means includes at least one helical spring disposed coaxial with said shaft means and having one portion thereof rigidly affixed to said shaft means, and another portion thereof resiliently engaging a portion of said gate.

4. In a tail gate assembly as recited in claim 1, wherein said shaft means includes a pair of axially aligned bars having facing end portions coupled to said resilient means.

5. In a tail gate assembly as recited in claim 4, wherein said resilient means includes at least one helical spring disposed coaxial with each said bar, with each said spring having a first portion attached to one of said bars and a second portion in engagement with said gate.

6. In a tail gate assembly as recited in claim 1, wherein said shaft means and said resilient means are disposed within an elongated channel member having a generally U-shaped cross section, said channel member being adapted to form the lower most edge of said gate.

7. In a tail gate assembly as recited in claim 1, and further comprising stop means affixed to a lower portion of said gate for engagement by said arm means so as to limit rotation thereof about said axis.

* * * * *